United States Patent [19]
Nakata

[11] Patent Number: 5,499,262
[45] Date of Patent: Mar. 12, 1996

[54] SEMICONDUCTOR LASER LIGHT SOURCE UNIT

[75] Inventor: Naotaro Nakata, Kyoto, Japan

[73] Assignee: Rohm Co., Ltd., Kyoto, Japan

[21] Appl. No.: 22,549

[22] Filed: Feb. 25, 1993

[30] Foreign Application Priority Data

| Mar. 18, 1992 | [JP] | Japan | 4-062065 |
| Mar. 18, 1992 | [JP] | Japan | 4-062066 |
| Mar. 25, 1992 | [JP] | Japan | 4-066538 |

[51] Int. Cl.[6] ............................................. H01S 3/08
[52] U.S. Cl. ..................... 372/108; 359/668; 359/719
[58] Field of Search .............................. 359/668, 719; 372/108

[56] References Cited

U.S. PATENT DOCUMENTS

| 4,253,735 | 3/1981 | Kawamura et al. | 359/668 |
| 4,575,194 | 3/1986 | Streifer et al. | 359/652 |
| 4,722,581 | 2/1988 | Hamada et al. | 359/738 |
| 4,805,997 | 2/1989 | Asahara et al. | 359/668 |
| 4,915,484 | 4/1990 | Yamamoto | 359/668 |
| 5,095,386 | 3/1992 | Scheibengraber | 359/668 |
| 5,161,064 | 11/1992 | Clark et al. | 359/668 |

*Primary Examiner*—Rodney B. Bovernick
*Assistant Examiner*—Robert E. Wise
*Attorney, Agent, or Firm*—Brumbaugh, Graves, Donohue & Raymond

[57] ABSTRACT

A rod lens or a cylindrical lens is disposed in front of a semiconductor laser to increase a divergence angle of a laser beam emitted from the semiconductor laser so as to form a substantially circular far field pattern. In another constitution, there is disposed in front of a semiconductor laser a composite lens having two cylindrical surfaces whose cylindrical axes are perpendicular to each other. The cylindrical surface on the side of the semiconductor laser is a convex surface and the other cylindrical surface is a convex or concave surface. In still another constitution, two semiconductor lasers emitting the same optical signal are arranged adjacent each other so that respective light emitting portions of two pn junction planes are located in the same plane and perpendicular to each other, and that laser beams form orthogonal spots at a single predetermined position.

19 Claims, 7 Drawing Sheets

SEMICONDUCTOR LASER LIGHT SOURCE UNIT

BACKGROUND OF THE INVENTION

The present invention relates to a semiconductor laser light source unit used for a remote control unit, an optical transmission unit, a unit for high-speed optical communication, etc.

Conventionally, a GaAs LED (wavelength: 950 nm) is used as a light source for a remote controller. While the GaAs LED has a rise time of 1 μsec, an AlGaAs LED (wavelength: 850 nm), which has come to be used as a light source for high-speed optical signal transmission, has a shorter rise time of 0.3 μsec.

However, even the AlGaAs LED cannot be used to transmit a high-frequency signal of more than 1 MHz. That is, the infrared light of the AlGaAs LED cannot accommodate the spatial transmission of an audio-video signal and an optical signal for communication between computers, which signals should carry a large amount of information.

To accommodate such cases, a semiconductor laser, whose build up is faster than the above-mentioned infrared LEDs and which enables transmission of high-speed pulses, is now being given much attention. However, the divergence angle of a laser beam emitted from the semiconductor laser depends on the angle around its axis, and the beam cross-section is elliptical rather than circular. More specifically, the laser beam travels toward a light-receiving surface with its cross-section assuming an elliptical far field pattern (FFP) whose major-axis is perpendicular to the pn junction plane (hereinafter also called "chip junction plane") of a laser chip.

Therefore, the laser beam can be directed easily so as to properly illuminate a predetermined position in the major-axis direction of the elliptical pattern, but is hardly directed to the predetermined position in the minor-axis direction (i.e., the direction in parallel with the chip junction plane) in which direction the light intensity distribution is too narrow. For example, when a device including a semiconductor laser is installed, its positioning with respect to a light-receiving surface is very difficult. In particular, such positioning by manual handling is extremely difficult.

On the other hand, the angular half-width (full width at half maximum) of the light intensity distribution in the major-axis direction of the elliptical pattern (the cross-section perpendicular to the beam axis) varies over a wide range of 25° to 45°. As a result, a peripheral part of the laser beam cannot be utilized because its light intensity is too low. For example, if the half-width of the light intensity distribution is in the 350°–45° range, the peripheral part of the beam has too low intensity to be used in a remote controller.

As a countermeasure, the light output power of the semiconductor laser needs to be increased to compensate for the unusable peripheral part of the beam. However, there arises a problem that high-light-output semiconductor lasers are expensive and have large electric power consumption. They are not suitable specifically for a battery-driven, handy terminal.

SUMMARY OF THE INVENTION

The present invention has been made to solve the above-described problems, and has an object of providing a semiconductor laser light source unit which enables easy setting of a laser beam direction as well as high-speed transmission of a large amount of information. At the same time, it is also intended to enable reduction of the light output power by effectively utilizing a peripheral part of the laser beam.

Another object of the invention is to provide a low-cost semiconductor laser light source unit which enables easy setting of a laser beam direction as well as high-speed transmission of a large amount of information.

According to a first aspect of the invention, a semiconductor laser light source unit comprises:

a semiconductor laser for emitting a laser beam having an elliptical sectional shape; and optical means for increasing a divergence angle of the laser beam in a direction parallel with a minor-axis of the elliptical sectional shape so as to produce a substantially circular far field pattern of the laser beam.

With the above constitution, the divergence angle of the laser beam loses dependence on the angle around its axis, and isotropic illumination can be attained.

According to a second aspect of the invention, a semiconductor laser light source unit comprises:

a semiconductor laser for emitting a laser beam having an elliptical sectional shape; and a lens comprising a first cylindrical surface having a first cylindrical axis that is in parallel with a minor-axis of the elliptical sectional shape for decreasing a first divergence angle of the laser beam in a direction of a major-axis of the elliptical sectional shape, and a second cylindrical surface having a second cylindrical axis that is in parallel with the major-axis of the elliptical sectional shape for increasing a second spreading angle of the laser beam in a direction of the minor-axis of the elliptical sectional shape.

With the above constitution, since the beam divergence angle is decreased in the direction parallel with the major-axis of the elliptical sectional shape, it becomes possible to reduce the proportion of an unusable peripheral part of the laser beam. Further, the provision of the circular far field pattern enables isotropic illumination.

According to a third aspect of the invention, in a semiconductor laser light source unit, a plurality of semiconductor lasers are arranged adjacent each other so that light emitting portions of respective chip junction planes are not in parallel with each other, and emit respective laser beams carrying the same signal toward a single predetermined position.

With the above constitution, a plurality of light spots are formed at the single predetermined position to produce a less anisotropic pattern there.

DESCRIPTION OF THE PREFERRED EMBODIMENTS

Embodiments of the present invention are described hereinafter with reference to the accompanying drawings. In the following description, it is assumed in the drawings that the cross-section of a laser beam is in the XY-plane (stated more strictly, in a plane parallel with the XY-plane as defined by the coordinate system indicated in the figures).

Figure 1:
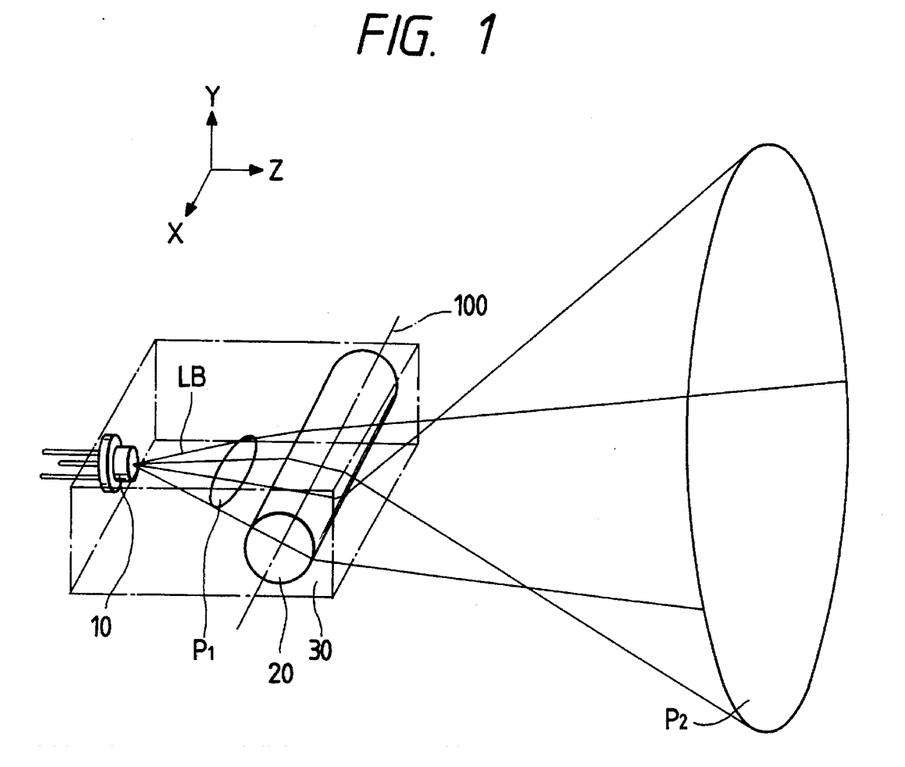
FIG. 1 is a perspective view schematically showing a semiconductor laser light source unit according to a first embodiment of the present invention.

FIG. 1 is a perspective view schematically showing constitution of a light source unit according to a first embodiment of the invention, which mainly consists of a semiconductor laser 10, a rod lens 20 and a body 30 (only the outline of which is indicated by the chain line in FIG. 1).

The semiconductor laser 10 is of a general, package-type laser diode in which a laser chip is hermetically sealed in a can. A single laser chip (indicated by reference numeral 15 in FIG. 3) emitting a single laser beam LB (wavelength: 780 nm) is provided in the semiconductor laser 10. The laser beam LB is emitted from the cleavage surface toward a predetermined position, i.e., along the Z-direction. The rod lens 20 is a circular rod lens having a constant diameter in its axial direction 100. The head of the semiconductor laser 10 is inserted into and fixed to the box-shaped body 30. The end faces of the rod lens 20 are fixed to the inner wall of the body 30.

The semiconductor laser 10 and the rod lens 20 are positioned to each other in the following manner. First, while the pn junction plane of the laser chip 15 of the semiconductor laser 10 is placed in the YZ-plane, the central axis of the emitted laser beam LB is positioned along the Z-axis. As a result, a sectional pattern P of the laser beam LB assumes an elliptical shape whose major-axis extends along the X-direction. On the other hand, the rod lens 20 is positioned so that its axis 100 becomes in parallel with the X-direction.

Figure 2:
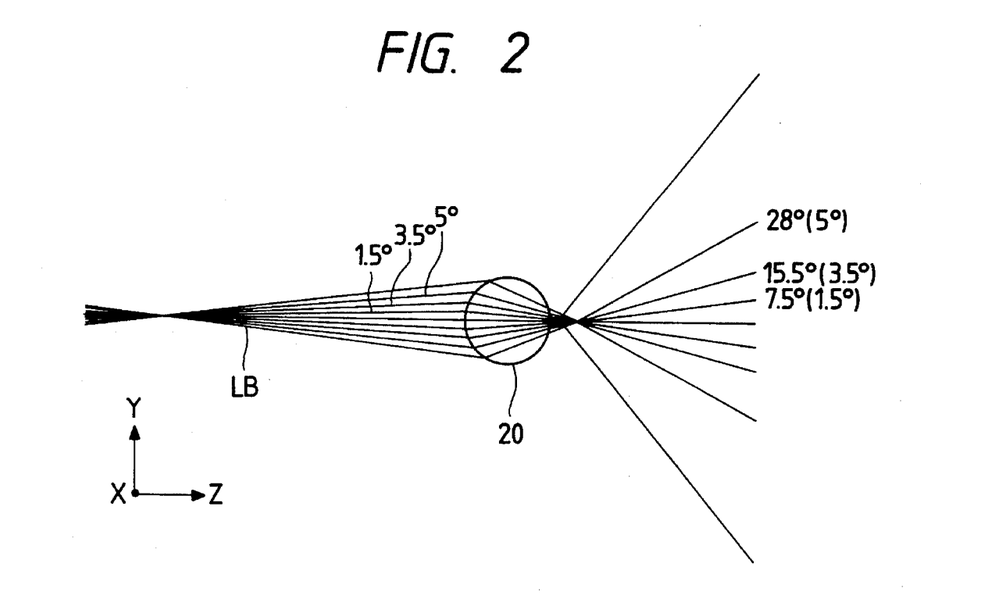
FIG. 2 is a light path diagram in the YZ-plane.
Figure 3:
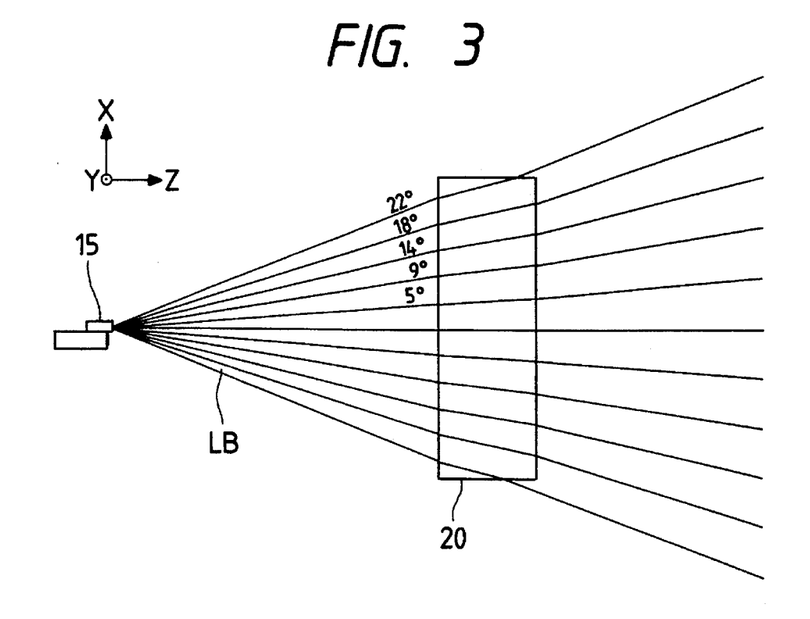
FIG. 3 is a light path diagram in the ZX-plane.

After passing through the rod lens 20, the sectional pattern of the laser beam LB is changed to a circular pattern $P_2$. FIGS. 2 and 3 show paths of the laser beam LB in the YZ- and ZX planes, respectively. In the YZ-plane, light rays entering the rod lens 20 at incident angles 1.5°, 3.5° and 5° exit therefrom at exit angles 7.5°, 15.5° and 28°, respectively to spread. On the other hand, in the ZX-plane where the rod lens 20 has no curvature, there exist only slight path variations. If it is assumed that the light rays having 100% light intensity enter the rod lens 20 at incident angles 1.5°, 3.5° and 5°, they exit therefrom with intensities 95%, 60% and 40%, respectively.

Figure 4:
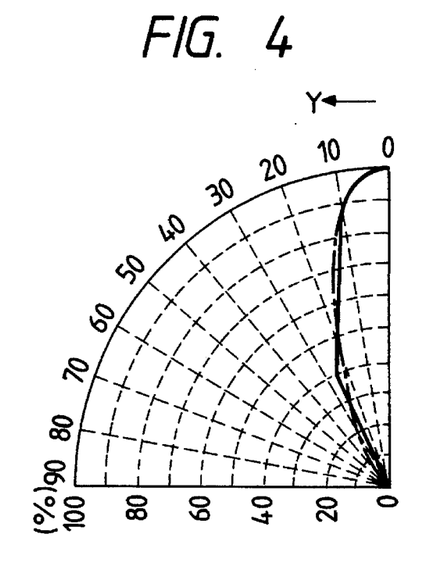
FIG. 4 is a graph showing a directivity in the YZ-plane.
Figure 5:
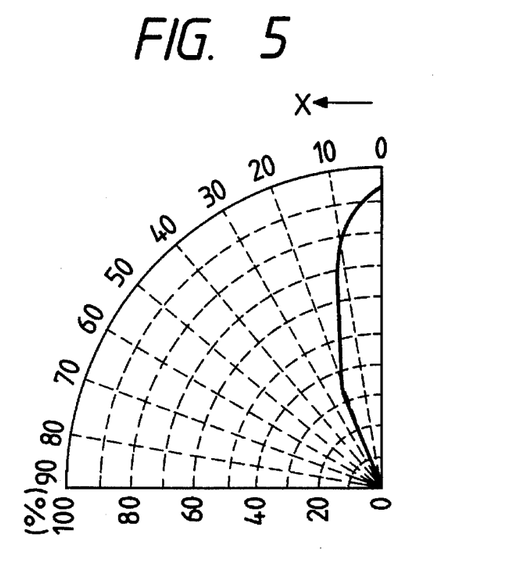
FIG. 5 is a graph showing a directivity in the ZX-plane.

FIGS. 4 and 5 (solid lines) show directivities in the Y- and X-directions, respectively of the laser beam LB emitted from the light source unit of this embodiment. It is understood that the directivity in the Y-direction is equivalent to that in the X-direction, on which the rod lens 20 has almost no influences. Further, the directivity in the Y-direction is almost equal to a directivity of an infrared LED, which is indicated by the chain line in FIG. 4.

According to this embodiment, after passing through the rod lens 20, the sectional pattern of the laser beam LB is changed to the circular pattern $P_2$ having half-value angles ±15° that is suitable for a remote network etc. Since the signal-detectable range is extended in the direction in parallel with the pn junction plane, the beam direction can be set easily.

In the case of conventional infrared LED light sources, it is difficult to converge, by an optical system, the laser beam to form a small spot on a p-i-n photodiode that constitutes a light-receiving surface. Therefore, a large p-i-n photodiode is employed conventionally, which however is associated with a problem of large background noise. In this embodiment, on the other hand, since the laser beam can easily be converged into a small spot, it becomes possible to employ a small p-i-n photodiode and, as a result, the SN ratio can be improved.

Further, enabling isotropic, wide-range illumination, the light source unit of this embodiment can also be applied to a field in which divergent light from a semiconductor laser is used, for instance, as infrared illumination light in a CCD camera burglar prevention system.

Figure 6:
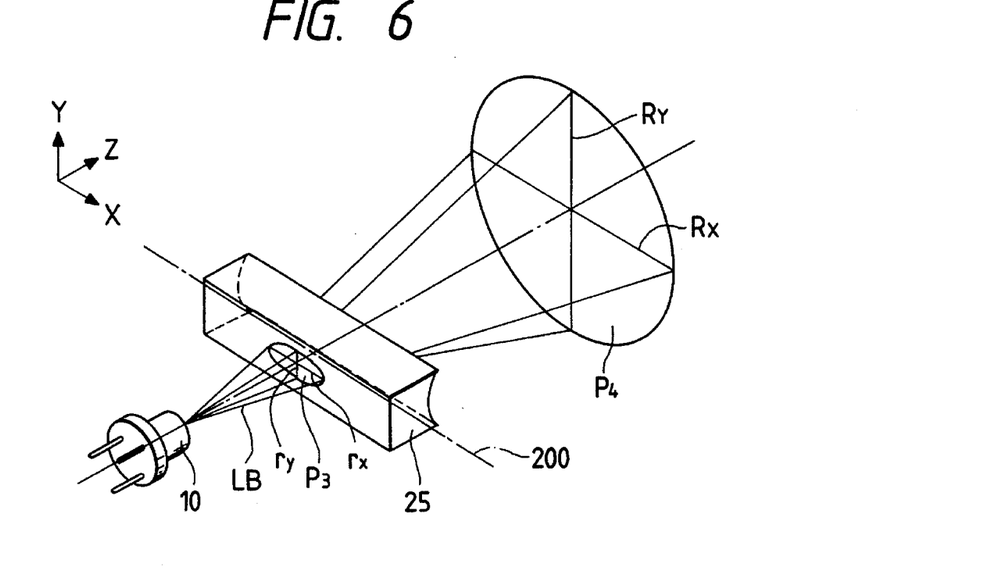
FIG. 6 is a perspective view schematically showing a semiconductor laser light source unit according to a second embodiment of the invention.

FIG. 6 shows a light source unit according to a second embodiment of the invention. This embodiment has the same constitution as the first embodiment except that the rod lens 20 is replaced by a cylindrical lens 25, and can provide the same advantages as the first embodiment.

The cylindrical lens 25 is positioned so that its axis 200 becomes in parallel with the X-direction. One surface of the cylindrical lens 25 on the side of the semiconductor laser 10 is a plane in parallel with the XY plane, and the other surface on the side of the laser beam output is a concave cylindrical surface, which has no curvature along the X-direction.

As in the case of the first embodiment, before passing through the cylindrical lens 25 the laser beam LB has an elliptical sectional pattern $P_3$ whose major-axis extends along the X-direction (radius $r_x > r_y$). After passing through the cylindrical lens 25, the sectional pattern of the laser beam LB is changed to a circular pattern $P_4$ (radius $R_x = R_y$). Therefore, the directivity in the Y-direction is expanded, like the case of the first embodiment.

While in FIG. 6 a concave surface is provided only on one side of the cylindrical lens 25, other types of cylindrical lenses may be used. A convex surface may be provided only on one side or on both sides, or a concave surface may be provided on both sides to form a cylindrical lens. Where the cylindrical lens has a concave surface(s), the laser beam LB is directly diverged. On the other hand, where the cylindrical lens has a convex surface(s), the laser beam LB converges and spreads thereafter, like the case of the rod lens 20 of the first embodiment (see FIG. 2).

Figure 7:
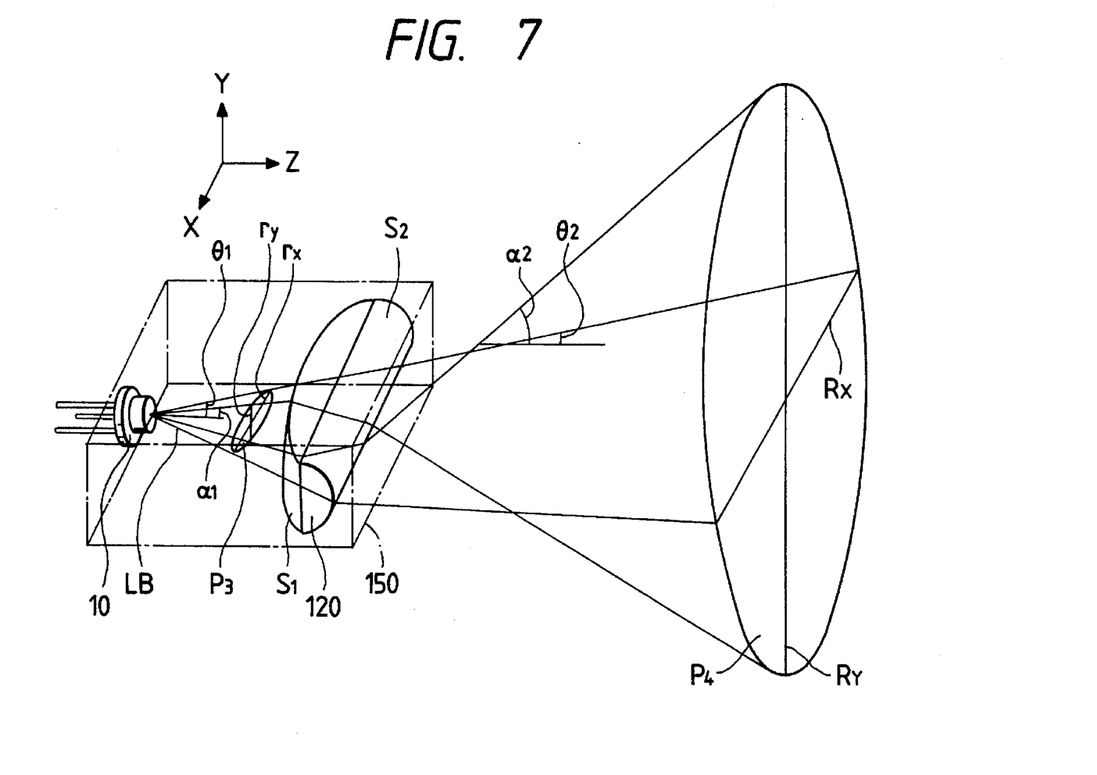
FIG. 7 is a perspective view schematically showing a semiconductor laser light source unit according to a third embodiment of the invention.
Figure 8:
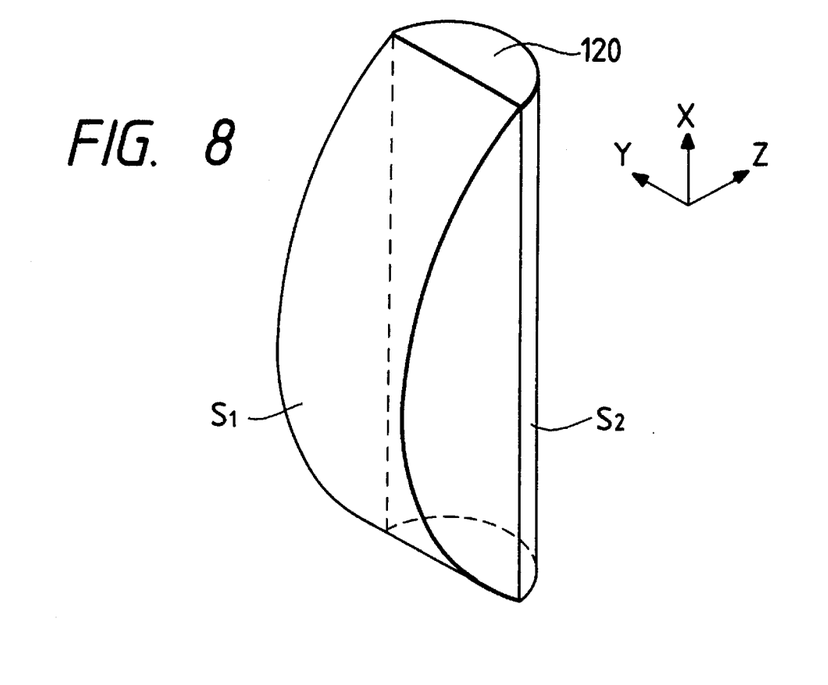
FIG. 8 is a perspective view showing an appearance of a lens used in the third embodiment.

FIG. 7 is a perspective view schematically showing constitution of a light source unit according to a third embodiment of the invention, and FIG. 8 is a perspective view showing an appearance of a lens 120 used in the light source unit of FIG. 7. The light source unit of this embodiment mainly consists of a semiconductor laser 10, the lens 120 and a body 150 (only the outline of which is indicated by the chain line in FIG. 7). The semiconductor laser 10 and the lens 120 are fixed to the body 150.

The semiconductor laser 10 is of a general, package-type laser diode in which a laser chip (not shown) is hermetically sealed in a can. A single laser chip emitting a single laser beam LB (wavelength: 780 nm) is provided in the semiconductor laser 10. The laser beam LB is emitted from the cleavage surface toward a predetermined position, i.e., along the Z-direction.

The lens 120 serves to correct the light intensity distribution of the laser light LB, and has a structure in which two cylindrical lenses are joined together such that their axes are perpendicular to each other. One cylindrical lens whose axis extends along the Y-direction has a first cylindrical surface $S_1$ on the side of the semiconductor laser 10. The other lens whose axis extends along the X-direction has a second cylindrical surface 2 on the side of the laser beam output.

The first cylindrical surface $S_1$ has the cylindrical axis that is in parallel with the Y-axis, i.e., perpendicular to the major-axis $r_x$ of a far field pattern $P_3$ of the laser beam LB, and serves to decrease the divergence angle of the laser beam LB in the ZX-plane from $\theta_1$ to $\theta_2$. The second cylindrical surface $S_2$ has the cylindrical axis that is in parallel with the X-axis, i.e., perpendicular to the cylindrical axis of the first cylindrical surface $S_1$, and serves to increase the divergence angle in the YZ-plane from $\alpha_1$ to $\alpha_2$.

The head of the semiconductor laser 10 is inserted into and fixed to the box-shaped body 150. The end faces of the lens 120 are fixed to the inner wall of the body 150.

The semiconductor laser 10 and the lens 120 are positioned to each other in the following manner. First, while the pn junction plane of the laser chip of the semiconductor laser 10 is placed in the YZ-plane, the central axis of the emitted laser beam LB is positioned along the Z-axis. As a result, a far field pattern $P_3$ of the laser beam LB assumes an elliptical shape whose major-axis extends along the X-direction. On the other hand, the cylindrical axis of the second cylindrical surface $S_2$ of the lens 120 is positioned along the X-direction.

In the direction parallel with the Y-direction, by passing through the lens 120, the laser beam once converges and then spreads to increase its divergence angle ($\alpha_1 < \alpha_2$). In the direction parallel with the X-direction, the divergence angle of the laser beam LB is reduced ($\theta_1 > \theta_2$). For example, $\theta_1$ and $\theta_2$ are 45° and 20°, respectively. As a result, the far field pattern changes from the elliptical pattern $P_3$ to the circular pattern $P_4$ that is suitable, for instance, for a remote network. In FIG. 7, $R_X$ and $R_Y$ correspond to $r_X$ and $r_Y$, respectively. With the above constitution, the signal detection range is expanded in the direction parallel with the pn junction plane, enabling easy setting of the beam direction.

Figure 13:
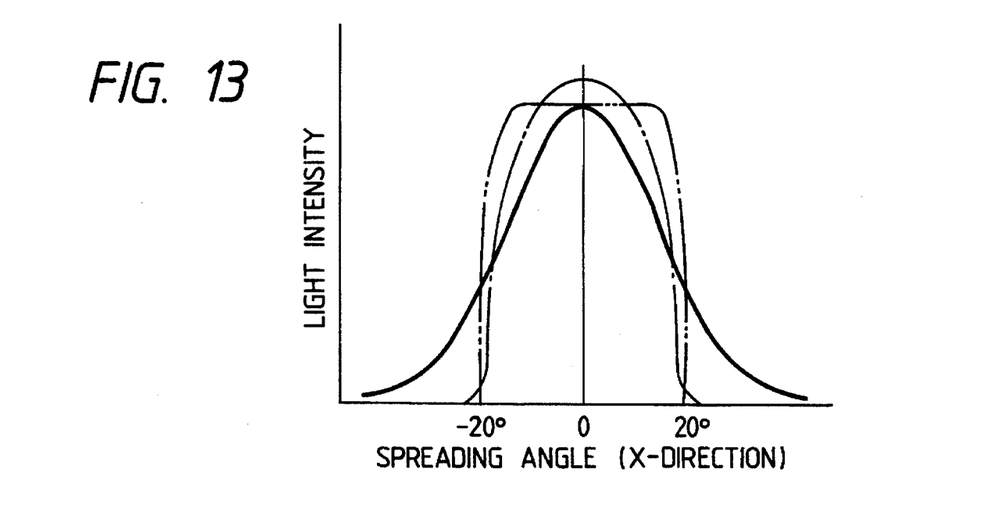
FIG. 13 is a graph showing a light intensity distribution in the X-direction in the third to sixth embodiments.

FIG. 13 shows light intensity distributions along the X-direction of the far field patterns $P_3$ (solid line) and $P_4$ (chain line). As is seen from this figure, the peripheral part of the light intensity distribution, which was not utilized actually before the invention, is now located within the divergence angle range of ±20°. Therefore, the peripheral part of the laser beam LB can be utilized effectively to equivalently increase the light intensity. It becomes possible to reduce the light output power.

In the case of conventional infrared LED light sources, it is difficult to converge, by an optical system, the laser beam to form a small spot on a p-i-n photodiode that constitutes a light-receiving surface. Therefore, a large p-i-n photodiode is employed conventionally, which however is associated with a problem of large background noise. In this embodiment, on the other hand, since the laser beam can easily be converged into a small spot, it becomes possible to employ a small p-i-n photodiode and, as a result, the SN ratio can be improved.

Further, enabling isotropic, wide-range illumination, the light source unit of this embodiment can also be applied to a field in which divergent light from a semiconductor laser is used, for instance, as infrared illumination of CCD camera burglar prevention system.

Figure 9:
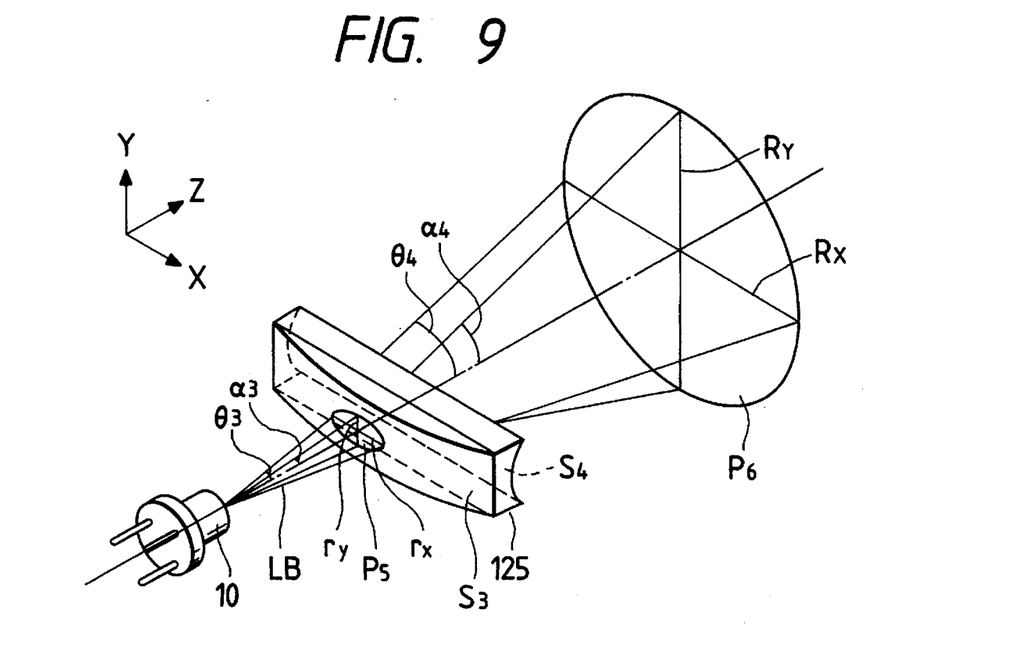
FIG. 9 is a perspective view schematically showing a semiconductor laser light source unit according to a fourth embodiment of the invention.
Figure 10:
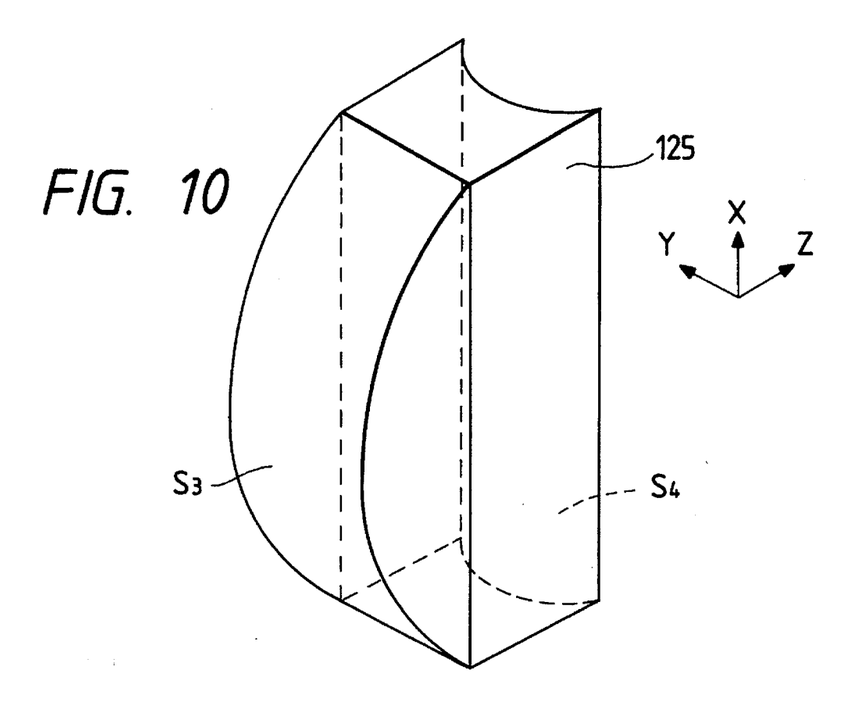
FIG. 10 is a perspective view showing an appearance of a lens used in the fourth embodiment.

FIG. 9 is a perspective view schematically showing constitution of a light source unit according to a fourth embodiment of the invention, and FIG. 10 is a perspective view showing an appearance of a lens 125 used in the light source unit of FIG. 9. This embodiment has the same constitution as the third embodiment except that the lens 120 is replaced by a lens 125, and can provide the same advantages as the third embodiment. That is, while in the third embodiment the second cylindrical surface $S_2$ on the side of the laser beam output is a convex surface, in the lens 125 of this embodiment a second cylindrical surface $S_4$ on the beam output side is a concave surface.

Like the far field pattern $P_3$ of the third embodiment, a far field pattern $P_5$ of the laser beam LB before reaching the lens 125 assumes an elliptical shape whose major-axis extends along the X-direction ($r_x > r_y$). By passing through the lens 125, the laser beam LB diverges in the Y-direction to increase its divergence angle ($\alpha_3 < \alpha_4$). On the other hand, the divergence angle of the laser beam LB is reduced ($\theta_3 > \theta_4$). For example, $\theta_3$ and $\theta_4$ are 45° and 20°, respectively. As a result, the far field pattern changes from the elliptical pattern $P_5$ to the circular pattern $P_6$ that is suitable, for instance, for a remote network. In FIG. 9, $R_X$ and $R_Y$ correspond to $r_x$ and $r_y$, respectively. With the above constitution, as in the case of the third embodiment, the signal detection range is expanded in the direction parallel with the pn junction plane, enabling easy setting of the beam direction.

In the third and fourth embodiments, if the portion of the first cylindrical surface $S_1$ or $S_3$ that receives the peripheral part of the far field pattern $P_3$ or $P_5$ has a curvature larger than that of the central portion, the light intensity distribution in the X-direction of the far field pattern $P_4$ or $P_6$ can be made flatter.

Figure 11:
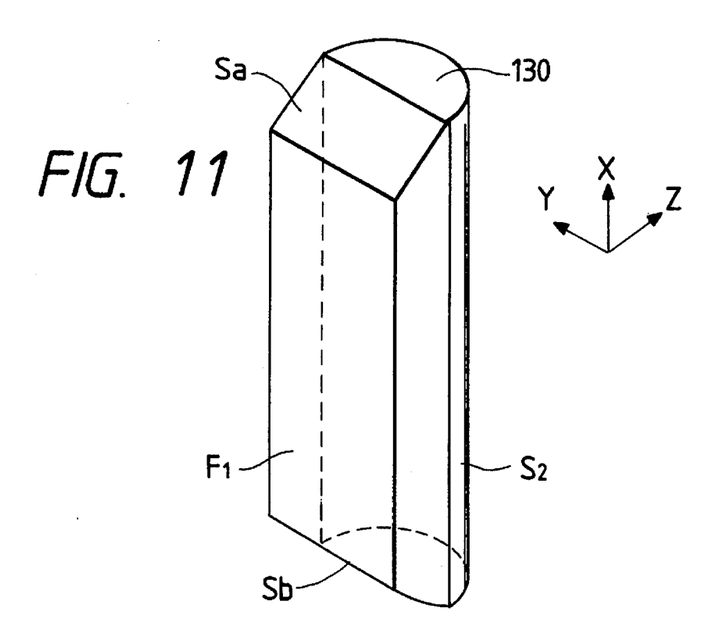
FIG. 11 is a perspective view showing an appearance of a lens used in fifth embodiment.

FIG. 11 is a perspective view showing an appearance of a lens 130 used in a light source unit according to a fifth embodiment of the invention. The lens 130 has a plane $F_1$ that is formed by cutting the first cylindrical surface $S_1$ of the lens 120 of the third embodiment by a plane in parallel with the XY-plane to remove its central portion. With this lens 130, the divergence angle of only the peripheral part of the laser beam LB is reduced in the X-direction by the cylindrical surfaces $S_a$ and $S_b$ that are the same as the first cylindrical surface $S_1$ of the lens 120. The spread of the peripheral part of the light intensity distribution can be changed as desired by adjusting the size of the plane $F_1$.

Figure 12:
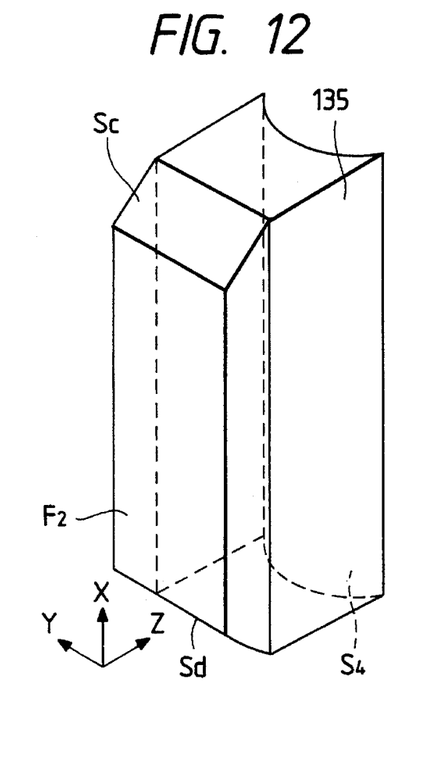
FIG. 12 is a perspective view showing an appearance of a lens used in a sixth embodiment.

FIG. 12 is a perspective view showing an appearance of a lens 135 used in a light source unit according to a sixth embodiment of the invention. The lens 135 has a plane $F_2$ that is formed by cutting the first cylindrical surface $S_3$ of the lens 125 of the fourth embodiment by a plane in parallel with the XY-plane to remove its central portion. With this lens 135, the divergence angle of only the peripheral part of the laser beam LB is reduced in the X-direction by the cylindrical surfaces $S_c$ and $S_d$ that are the same as the first cylindrical surface $S_3$ of the lens 125. The spread of the peripheral part of the light intensity distribution can be changed as desired by adjusting the size of the plane $F_2$.

FIG. 13 also shows, by the chain double-dashed line, a light intensity distribution in the X-direction of the far field pattern formed in the fifth or sixth embodiment. Like the case of the third and fourth embodiments, the peripheral part of the light intensity distribution, which was not utilized actually before this invention, is now located within the divergence angle range of ±20°. In addition, the light intensity distribution in the X-direction of the far field pattern becomes flatter to enable more uniform illumination of the light-receiving surface.

Figure 14:
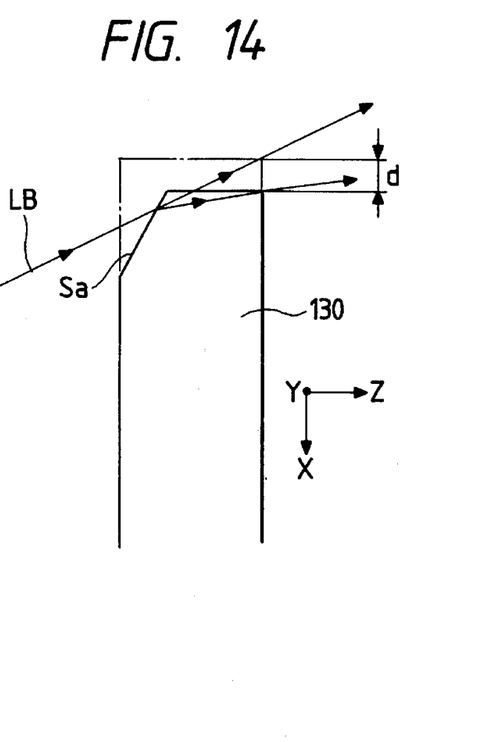
FIG. 14 is a diagram showing a light path in the end portion of the lens used in the fifth and sixth embodiments.

FIG. 14 shows a light path at the end portion of the lens 130 used in the fifth embodiment. Since the divergence angle of the laser beam LB is reduced by the surface $S_a$, in this end portion the lens 130 can be shorter, by a length d, than the case of a flat surface indicated by the chain line. The third, fourth and sixth embodiments can also provide the same advantage.

Figure 15:
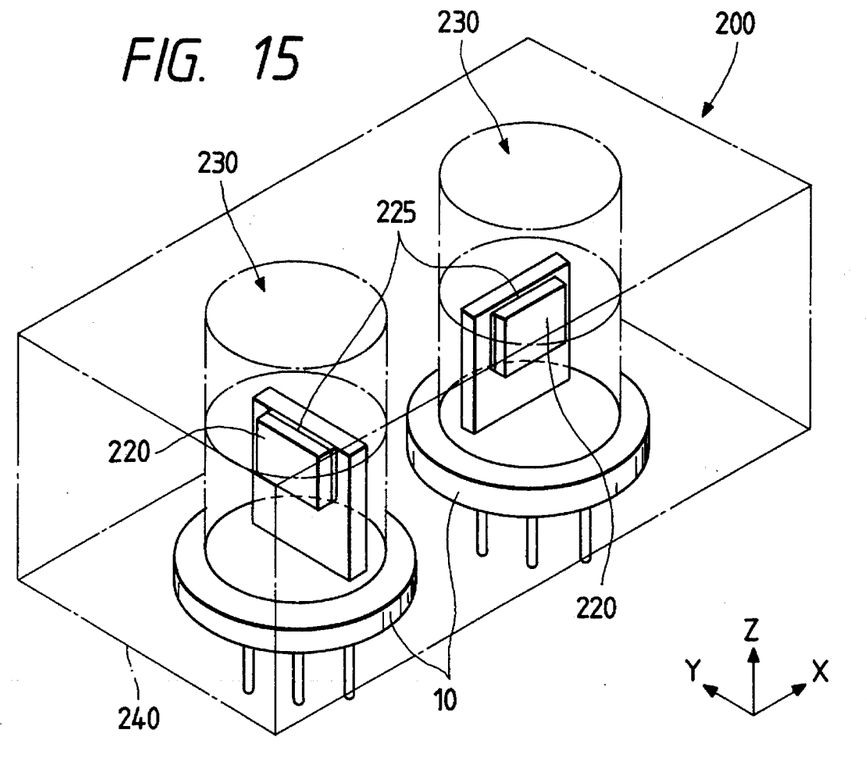
FIG. 15 is a perspective view schematically showing a semiconductor laser light source unit according to a seventh embodiment of the invention.

FIG. 15 is a perspective view schematically showing a light source unit according to a seventh embodiment of the invention. A light source unit 200 mainly consists of two semiconductor lasers 10 and a fixing member 240 (only the outline of which is indicated by the chain line in FIG. 15). The two semiconductor lasers 10 are fixed to the member 240. Each semiconductor laser 10 is of a general, package-type laser diode in which a laser chip 220 is hermetically sealed in a can. A single laser chip 220 emitting a single laser beam (wavelength: 780 nm) is provided in each semiconductor laser 10. The laser beams are emitted from the pn junction planes 225 of the laser chips 220 toward the same predetermined position, i.e., along the Z-direction. Since the respective semiconductor lasers 10 are connected to a power source in parallel so as to be on/off-controlled synchronously, they emit the same signal concurrently.

Two through holes 230 are provided in the fixing member 240. The heads of the semiconductor lasers 10 are inserted into and fixed to the respective through holes 230 to form the light source unit 200. The two through holes 230 are formed in parallel with each other, and the position of the beam emitting portion of each pn junction plane 225 is adjusted on the center line of the corresponding through hole 230 to prevent interruption of the diverging laser beam.

The semiconductor lasers 10 are arranged and fixed so that the beam emitting portions of the pn junction planes 225 of the respective laser chips 220 are orthogonal. That is, in this embodiment, the pn junction plane 225 of one laser chip 220 is located in the YZ-plane, and the pn junction plane 225 of the other laser chip 220 is located in the ZX-plane. Both beams are emitted along the Z-direction.

Figure 16:
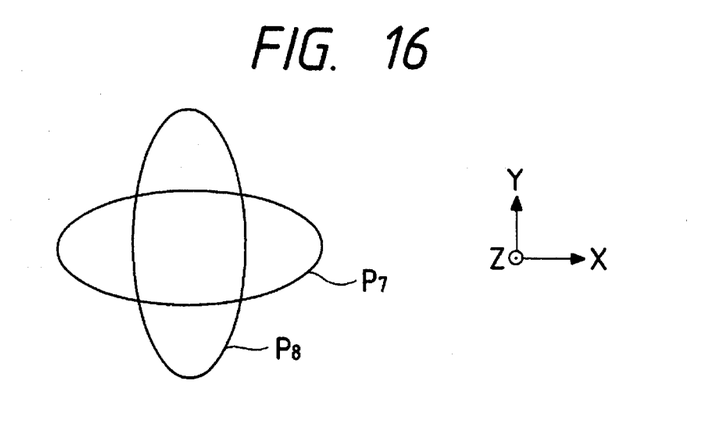
FIG. 16 shows a cruciform pattern formed by two laser beams in the seventh embodiment.

Since the laser beams emitted from the pn junction planes 225 have an elliptical sectional shape whose major-axis extends in the direction perpendicular to the pn junction plane 225, they travel toward a light-receiving surface located at a predetermined position with their cross-sections assuming an elliptical far field pattern. As a result, as shown in FIG. 16, two orthogonal spots $P_7$ and $P_8$ are formed on the same predetermined position by the respective beams to produce a cruciform pattern. The two beams can be emitted along the Z-direction as mentioned above, i.e., need not be inclined, because the predetermined position of the light-receiving surface is usually very far from the light source unit compared to the beam interval. If the diameter of the semiconductor lasers 10 is 5.6 mm, a practical value of their interval is about 10 mm.

If it is assumed that the detectable range, in terms of the beam divergence angle, of one semiconductor laser 10 is ±30°–40° in the direction perpendicular to the pn junction plane 225 and ±10°–15° in the direction parallel therewith, the light source unit of the invention can improve the latter detectable range to ±30°–40°.

Although in the above embodiment one package of the semiconductor laser 10 contains only one laser chip 220, there may be employed another type of semiconductor laser in which one package contains two or ore laser chips. Although in the above embodiment the two semiconductor lasers 10 are fixed to the single fixing member 240, three or more semiconductor lasers 10 may be employed. If the beam emitting portions of the pn junction planes 225 are not in parallel with each other, the spots formed at the same predetermined position cross each other. Therefore, a pattern closer to the circular pattern than the cruciform pattern of FIG. 16 can be produced by arranging three or more laser chips 220 in the XY-plane at proper angles.

According to the seventh embodiment, the signal detectable range can be increased in the direction parallel with the pn junction plane 225 to thereby facilitate setting of the beam direction. Further, since two semiconductor lasers are less expensive than one lens, the light source unit of this embodiment can be produced at a lower cost than the case of using a lens. In the case of conventional infrared LED light sources, it is difficult to converge, by an optical system, the laser beam to form a small spot on a p-i-n photodiode that constitutes a light-receiving surface. Therefore, a large p-i-n photodiode is employed conventionally, which however is associated with a problem of large background noise. In this embodiment, on the other hand, since the laser beam can easily be converged into a small spot, it becomes possible to employ a small p-i-n photodiode and, as a result, the SN ratio can be improved.

According to the invention, as described above by way of the first and second embodiments, the use of the semiconductor laser enables transmission of a large amount of information at high speed. By virtue of the provision of the optical system (e.g., a rod lens or cylindrical lens) for diverging or converging the laser beam emitted from the semiconductor laser so as to produce a circular sectional shape, the direction of the laser beam can be set easily. As a result, a device including a semiconductor laser can easily be positioned with respect to a light-receiving surface when it is installed. This advantage is more remarkable when the device needs to be positioned manually.

Further, since the circular sectional shape of the laser beam enables isotropic, wide-range illumination, the semiconductor laser light source unit of the invention is applicable to dark field illumination for security purposes.

According to the invention, as described above by way of the third to sixth embodiments, the use of the semiconductor laser enables transmission of a large amount of information at high speed. By virtue of the provision of the lens having two cylindrical surfaces whose axes are arranged perpendicularly to each other, it becomes possible to effectively utilize the peripheral part of the laser beam, and to reduce the light output power. Further, the direction of the laser beam can be set easily.

By lowering the light output power, the efficiency of power utilization can be improved by more than 30%. Where the portion of the first cylindrical surface that receives the peripheral part of the far field pattern has a curvature larger than the central portion (for example, the peripheral portion is a curved surface and the central portion is a flat surface), the light intensity distribution with respect to the beam divergence angle becomes flatter to enable more uniform illumination of the light-receiving surface.

Since the first cylindrical surface can decrease the beam divergence angle in the major-axis direction of the far field pattern, the length of the lens can be reduced accordingly. As a result, the light source unit can be made more compact.

Since the direction of the laser beam can be set easily, a device including a semiconductor laser can easily be positioned with respect to a light-receiving surface when it is installed. This advantage is more remarkable when the device needs to be positioned manually.

Further, since the circular sectional shape of the laser beam enables isotropic, wide-range illumination, the semiconductor laser light source unit of the invention is applicable to dark field illumination for security purposes.

According to the invention as described above by way of the seventh embodiment, high-speed transmission of a large amount of information becomes possible by using the laser chips having the pn junction planes from which the laser beams are emitted toward the same predetermined position. The direction of the beams can be set easily by arranging at least two laser chips so that the beam emitting portions of the pn junction planes are not in parallel with each other. Further, the cost reduction can be attained by virtue of unnecessariness of using an expensive optical system. In particular, the setting of the beam direction can be facilitated by orthogonally arranging the beam emitting portions of the two laser chips.

What is claimed is:

1. A semiconductor laser light source unit comprising:
   a semiconductor laser for emitting a laser beam having an elliptical sectional shape; and
   optical means having orthogonal axes of different curvature with the axis of greater curvature being disposed parallel to the major axis of the elliptical sectional shape for increasing a divergence angle of the laser beam in a direction parallel with a minor-axis of the elliptical sectional shape so as to produce a substantially circular far field pattern of the laser beam.

2. The semiconductor laser light source unit of claim 1, wherein the optical means is a rod lens.

3. The semiconductor laser light source unit of claim 1, wherein the optical means is a cylindrical lens.

4. The semiconductor laser light source unit of claim 3, wherein the cylindrical lens has at least one convex surface.

5. A semiconductor laser light source unit comprising
   a semiconductor laser for emitting a laser beam having an elliptical sectional shape; and
   optical means for increasing a divergence angle of the laser beam in a direction parallel with a minor-axis of the elliptical sectional shape so as to produce a substantially circular far field pattern of the laser beam wherein the optical means is a cylindrical lens and wherein the cylindrical lens has at least one concave surface.

6. A semiconductor laser light source unit comprising:
   a semiconductor laser for emitting a laser beam having an elliptical sectional shape; and
   a lens comprising a first cylindrical surface having a first cylindrical axis that is in parallel with a minor-axis of the elliptical sectional shape for decreasing a first divergence angle of the laser beam in a direction of a major-axis of the elliptical sectional shape, and a second cylindrical surface having a second cylindrical axis that is in parallel with the major-axis of the elliptical sectional shape for increasing a second divergence angle of the laser beam in a direction of the minor-axis of the elliptical sectional shape.

7. The semiconductor laser light source unit of claim 6, wherein the lens produces a substantially circular far field pattern of the laser beam.

8. The semiconductor laser light source unit of claim 6, wherein the first cylindrical surface is located on a side of the semiconductor laser and the second cylindrical surface is located on a side opposite to the semiconductor laser.

9. The semiconductor laser light source unit of claim 6, wherein the second cylindrical surface is a convex surface.

10. The semiconductor laser light source unit of claim 6, wherein the second cylindrical surface is a concave surface.

11. The semiconductor laser light source unit of claim 6, wherein a peripheral portion of the first cylindrical surface has a larger curvature than a central portion thereof.

12. The semiconductor laser light source unit of claim 11, wherein the central portion of the first cylindrical surface is a flat surface.

13. A single lens comprising:
    a first cylindrical surface having a first cylindrical axis; and
    a second cylindrical surface having a second cylindrical axis that is perpendicular to the first cylindrical axis whereby an elliptical illumination pattern may be converted to a circular illumination pattern.

14. The lens of claim 13, wherein the first cylindrical surface is a convex surface.

15. The lens of claim 13, wherein the second cylindrical surface is a convex surface.

16. The lens of claim 13, wherein a peripheral portion of the first cylindrical surface has a larger curvature than a central portion thereof.

17. The lens of claim 16, wherein the central portion of the first cylindrical surface is a flat surface.

18. The lens of claim 13, wherein the lens is formed by joining together a first lens portion having the first cylindrical surface and a second lens portion having the second cylindrical surface.

19. A lens comprising:
    a first cylindrical surface having a first cylindrical axis; and
    a second cylindrical surface having a second cylindrical axis that is perpendicular to the first cylindrical axis that is perpendicular to the first cylindrical axis wherein the second cylindrical surface is a concave surface.

* * * * *